Oct. 21, 1930.   A. A. OSWALD ET AL   1,778,725
CONTROL OF ELECTRICAL CONDITIONS
Original Filed Sept. 11, 1924

Inventor:
Arthur A. Oswald
Ernest J. Sterba
by _____ Atty.

Patented Oct. 21, 1930

1,778,725

UNITED STATES PATENT OFFICE

ARTHUR ADOLPH OSWALD, OF MAPLEWOOD, NEW JERSEY, AND ERNEST JOSEPH STERBA, OF NEW YORK, N. Y., ASSIGNORS TO WESTERN ELECTRIC COMPANY, INCORPORATED, OF NEW YORK, N. Y., A CORPORATION OF NEW YORK

CONTROL OF ELECTRICAL CONDITIONS

Application filed September 11, 1924, Serial No. 737,188. Renewed March 24, 1930.

This invention relates to the control of magnetic and electrical conditions, and has as an object the control or regulation of, for instance, voltage or current conditions or the like in electric circuits, or flux conditions in magnetic circuits.

It is also an object of the invention to provide simple means capable of quickly and closely regulating such conditions and requiring little or no skilled attendance.

For brevity and clearance the invention is disclosed hereinafter with especial reference to its application in voltage regulation. Other applications, as for instance in current regulation, will be apparent from the disclosure. In a form of the invention specifically shown and described herein by way of illustration, an A. C. load voltage is regulated by making it dependent not only upon the voltage of the A. C. supply line but also upon the voltage drop in a coil traversed by alternating current from the line and wound on a ferromagnetic core that is traversed by a steady magnetic flux and by an opposing unidirectional magnetic flux dependent in value upon the A. C. line voltage. Decrease of line voltage, tending to produce a decrease of load voltage, causes a decrease in the variable, unidirectional flux, and consequently the flux density in the core increases, the resulting change in the voltage drop across the coil being a decrease, which is caused to effect an increase in the load voltage and thus compensate for the decrease in load voltage produced by the decrease in line voltage. Similarly, upon increase of line voltage, the voltage drop across the coil is increased, and causes the load voltage to decrease to compensate for the increase in the load voltage produced by the increase in line voltage.

Figure 1:
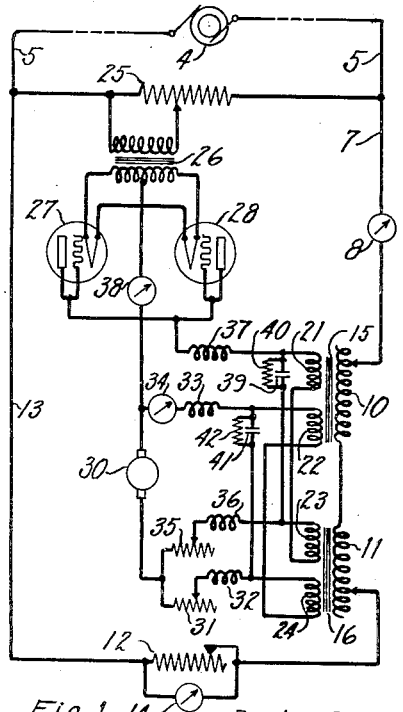
Figure 3:
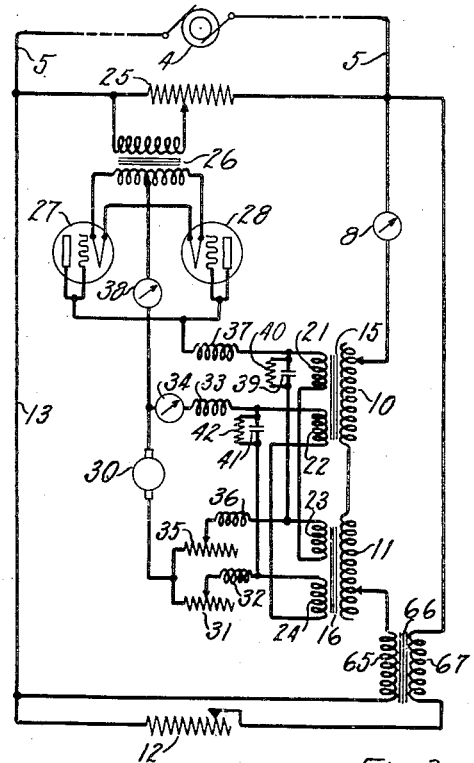
Figure 2:
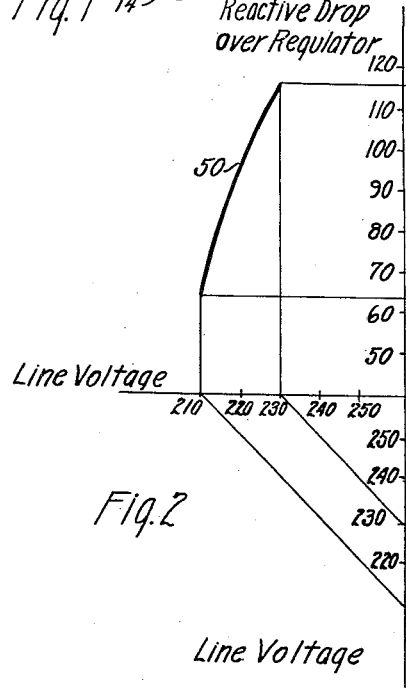

In the accompanying drawings, Fig. 1 is a circuit diagram of one form of the invention; Fig. 2 is a diagram showing how a required characteristic of the regulator may be ascertained; and Fig. 3 is a circuit diagram of a modified form of the invention.

Referring especially to Fig. 1, an alternating current generator 4 and a line 5 supply alternating electromotive force to a load 12 through a circuit including conductor 7, ammeter 8, reactance coils 10 and 11, the load 12, and conductor 13. A voltmeter 14 is shown connected across the load. The coils 10 and 11 are wound on ferromagnetic cores 15 and 16, respectively. Also, the core 15 has windings 21 and 22, and the core 16 has windings 23 and 24.

Across the line 5 there is connected a resistance 25, across a portion of which is connected the primary winding of a transformer 26, the secondary windings of which supply heating current for the cathodes of two thermionic space discharge devices 27 and 28.

Current flows from direct current source of electromotive force, 30, through a current adjusting resistance 31, a choke coil 32, the windings 24 and 22, a choke coil 33, and an ammeter 34. Current also flows from the source through a current adjusting resistance 35, a choke coil 36, the windings 23 and 21, a choke coil 37, the devices 27 and 28 in parallel, and an ammeter 38.

The direct current in the windings 24 and 22 establishes a flux approaching magnetic saturation in the cores 16 and 15, for instance a flux corresponding to a point on the upper portion of the knee of the B-H curve. The flux created in the core 16 by current in the winding 23 opposes the flux established in that core by the winding 24; and the flux created in the core 15 by current in the winding 21 opposes the flux established in that core by the winding 22. In a case where the material of cores 16 to 15 is, for instance, a good grade of ordinary transformer steel, the maximum intended fluxes produced by coils 23 and 21 are preferably such that the resultant flux due to 24 and 23 or to 22 and 21 corresponds to a point on the steep part of the B-H curve—say a point below the knee of the curve, or approximately the point of maximum slope of the curve; and the normal values of the fluxes produced by coils 23 and 21 are preferably such that the resultant flux due to 24 and 23 or to 22 and 21 corresponds to a point on the middle or the lower portion of the knee of the curve. These flux values are of course only representative, and may be varied considerably.

Coils 24 and 22 are so connected that the electromotive forces induced in them by the current in windings 10 and 11 are in opposition; and coils 23 and 21 are so connected that the electromotive forces induced in them by the current in windings 10 and 11 are in opposition. The electromagnetic devices comprising the cores 15 and 16 and the windings 10, 11, 21, 22, 23 and 24 are proportioned to make any currents induced in windings 21, 22, 23 and 24 as small as practicable. However, even where the use of the two coils and the four D. C. windings is resorted to and care is exercised in the proportioning of the cores and their windings, choke coils 32 and 33 and choke coils 36 and 37 are preferably employed, so that any unbalanced alternating current can be reduced to a very small value. During the use of the regulator the flux in cores 15 and 16 is preferably maintained within such limits that the flux range due to the alternating magnetizing force of coils 10 and 11 is confined to a substantially straight line portion of the permeability curves for those cores. Then no harmonics will be induced in windings 21, 22, 23 and 24.

A condenser 39 and a resistance 40, in parallel, are preferably shunted across the windings 23 and 21; and a condenser 41 and a resistance 42, in parallel, are preferably shunted across the coils 24 and 22, these condensers and resistances serving to absorb the high voltages induced when switching the regulator into and out of circuit. The condensers 39 and 41 also serve to bypass harmonic currents.

In the operation of the system of Fig. 1 to maintain constant E. M. F. across the load 12 with a varying line voltage delivered by line 5, a rise in line voltage tends to increase the temperature of the filaments of the thermionic tubes 27 and 28 and thereby causes an increase in their space currents. This increase of current in windings 23 and 21 tends to reduce the flux density in the cores 16 and 15 and thereby increases their apparent permeability. The rise in permeability causes the reactive voltage drop across the coils 10 and 11 to increase just sufficiently to effect the desired compensation for the rise in line voltage. The voltage across the load 12 can therefore be maintained substantially constant, within the limits imposed by variations in the voltage of source 30, which can generally be kept very small.

In a similar manner the regulator compensates for decrease of line voltage, the decrease of voltage causing decrease in filament temperature, with consequent decrease of current in 21 and 23, this decrease of current producing an increase in the direct current magnetization of cores 15 and 16, and thereby an apparent decrease in their permeability and a decrease in the reactive voltage drop across coils 10 and 11.

The cores 15 and 16 may be of any suitable ferromagnetic material, for instance silicon steel. They should preferably be of a material such that the core loss is at least as small as for a good quality of transformer steel; and they should preferably be of a material such that their permeability characteristic (or $\mu$–H curve) has a substantially straight, steeply sloping portion of sufficient range to give the regulator the range of regulation desired.

Given the conditions under which the regulator is to operate, its required characteristic, that is, its required curve between the reactive voltage drop across the coils 10 and 11 as ordinates and the milliamperes of the combined space currents of the tubes 27 and 28 as abscissæ, can be conveniently obtained graphically as indicated in Fig. 2. Curve 50 shows the relation between the reactive drop required across coils 10 and 11 to maintain the voltage across load 12 constant as the line voltage varies. In plotting this curve, since the value that it is desired the load voltage shall have for any line voltage is known, the value of the reactive drop corresponding to any line voltage is readily obtained from the fact that the vector sum of the reactive drop across windings 10 and 11 and the voltage across the load must always equal the line voltage. If the load voltage instead of being maintained constant is to be increased or decreased upon change of line voltage, the curve 50 will vary accordingly. Curve 55 is the characteristic of the tubes 27 and 28, the transformer 26 and the resistance 25, and relates the line E. M. F. delivered to resistance 25 and the combined space currents of the tubes (for constant space circuit voltage and resistance). By projection of corresponding points of these two curves (that is, points at which the line voltages are equal), as indicated in Fig. 2, the required regulator characteristic 60, is obtained.

The system shown in Fig. 3 employs a regulator which, as indicated by the use of the same reference characters for designating like parts in Figs. 1 and 3, is similar to the regulator of Fig. 1; but in Fig. 3 the reactance coils 10 and 11 are connected in series with the primary winding 65 of a booster transformer 66, the secondary winding 67, of which is connected in series with the load 12. In the operation of the system of Fig. 3 to maintain constant E. M. F. across the load 12 with varying line voltage delivered by the line 5, a rise in line voltage tends to increase the temperature of the filaments of the thermionic tubes 27 and 28, and thereby cause an increase in their space currents. This increase of current in windings 23 and 21 tends to reduce the flux density in the cores 16 and 15 and thereby increase their apparent permeability. The rise in permeability causes the reactive voltage drop across the coils 10 and 11 to increase, and this increase reduces the current through winding 65 so that the E. M. F. induced in winding 67 by the current in winding 65 decreases just sufficiently to effect the desired compensation for the rise in line voltage. In a similar manner the regulator compensates for decrease of line voltage.

The substance of the invention is capable of incorporation in various organizations not specifically shown and described but within the scope of the appended claims. For instance the filaments 27 and 28, responsive to the electrical condition to be controlled, may be connected to the regulated circuit in such manner as to receive heating current proportional to the load current where it is desired that the regulator function primarily in response to current variation, as for example to regulate the load current of a variable impedance load in response primarily to the load current variations.

What is claimed is:

1. A voltage regulating system comprising a load circuit an alternating current supply circuit, a reactor having a core provided with a winding connected in series with said supply circuit, a second core, a winding on said second core connected in series with said first winding, means for producing a unidirectional magnetomotive force in each of said cores, and means for producing another unidirectional magnetomotive force in each of said cores directly dependent upon the voltage in said supply circuit for controlling the voltage applied to said load circuit.

2. A voltage regulating system comprising a load circuit an alternating current supply circuit, a plurality of reactors, each reactor having a core provided with a winding in series with said supply circuit, means for producing a unidirectional magnetomotive force in each of said cores, means for producing in each of said cores another unidirectional magnetomotive force directly dependent upon the voltage variations in said supply circuit for controlling the voltage applied to said load circuit.

3. A combination with an electric circuit of means for controlling an electrical condition thereof comprising a reactor having a plurality of cores each provided with a winding included in said circuit, said windings being connected in series, means for producing a magnetic flux in said cores comprising a source for supplying direct current to a second winding on each core, said second windings being connected in series with said source by a circuit of high impedance for alternating current, and said second windings being shunted by a path of low impedance for alternating current, whereby the flow of alternating current in the direct current circuit is prevented.

4. A combination with an electric circuit of means for controlling an electrical condition thereof comprising a reactor having a plurality of cores each provided with a winding included in said circuit, said windings being connected in series, means for producing a magnetic flux in said cores comprising a source for supplying direct current to a second winding on each core through a circuit of high impedance to alternating current and shunted by a path of low impedance for alternating current, said second windings being in series with said source but in series opposing relation with respect to the induced alternating current.

5. The combination with an electric circuit, and a voltage source connected to said circuit of means for maintaining a characteristic of the circuit constant comprising a reactor associated with said circuit and means for developing a magnetic flux in said reactor, the last mentioned means comprising an electric space discharge device controlled by variation of said source for controlling said flux to maintain said characteristic constant.

6. The combination with an alternating current circuit, of means for controlling an electrical condition thereof comprising a reactor connected in said circuit, means for developing in said reactor a steady magnetic flux, and means for developing in said reactor a unidirectional magnetic flux opposite in direction to said steady flux, the last mentioned means comprising an electric space discharge device controlled by variation of said condition and controlling said unidirectional flux.

7. The combination with a circuit and an alternating current source connected to said circuit, of means for controlling an electrical condition of said circuit comprising a reactor associated therewith and means for developing a magnetic flux in said reactor, said last mentioned means comprising a thermionic electric discharge tube having its cathode heating current controlled by said source and having its space current energizing said reactor to maintain the electrical condition constant.

8. The combination with an alternating current circuit, of means for regulating an electrical condition thereof comprising a reactor connected in said circuit, means for developing in said reactor a steady magnetic flux, and means for developing in said reactor a unidirectional magnetic flux opposite in direction to said steady flux, said last mentioned means comprising a thermionic electron tube having its cathode heating current controlled by said electrical condition and having its space current energizing said reactor.

9. The combination with an electrical circuit, of means for continuously regulating an electrical characteristic of said circuit, said means comprising: a reactor connected in said circuit and having a ferromagnetic core, and means comprising a space discharge device responding to variations in said electrical condition and closed circuits connected thereto and controlled thereby for developing in said reactor, a flux varying in such manner as to maintain said characteristic constant.

10. A voltage regulating system comprising an alternating current circuit, a plurality of reactors, each reactor having a core provided with a winding in series with said circuit and a direct current control winding, and means comprising a thermionic device governed by the alternating current circuit for controlling the energization of said direct current windings to vary the apparent permeability of said cores whereby the voltage drop in said series windings is varied to compensate for voltage changes in said alternating current circuit and maintain the voltage constant.

11. A voltage regulating system comprising an alternating current circuit, a plurality of reactors, each reactor having a core provided with a winding in series with said circuit, each core being further provided with windings, through which pass uni-directional currents, for producing opposing magnetic effects therein, and means for varying one of said uni-directional currents in accordance with the voltage variations in the alternating current circuit, whereby the apparent permeability of said cores is varied in accordance with fluctuations in voltage of said alternating current circuit, the voltage drop in said alternating current series windings being thereby inversely varied.

12. A voltage regulating system comprising an alternating current circuit, a plurality of reactors, each reactor having a core provided with a plurality of windings, the first of said windings being in series with said alternating current circuit, a second of said windings being connected to a constant uni-directional current source, a third winding being connected to a uni-directional current source and means associated with said third winding for varying the current therein in accordance with voltage fluctuations in said alternating current circuit, said second and third windings being arranged in opposing magnetic relation on said core whereby the apparent permeability of said core is varied, the voltage drop in said first winding being thereby inversely varied.

13. The combination of a load circuit, a variable voltage source connected to said load circuit, a device comprising an impedance coil connected to said load circuit, and means comprising a thermionic device controlled according to the voltage of said source for regulating the impedance of said coil to maintain the voltage on said load circuit constant.

14. The combination of a load circuit, a variable voltage source connected to said load circuit, a thermionic device comprising a cathode and anode, and a device comprising a core, means for controlling said thermionic device according to the voltage of said source, an impedance winding connected to said load circuit and wound on said core, and a winding connected between said cathode and anode and wound on said core for regulating the impedance of said impedance winding to maintain the voltage on said load circuit constant.

15. In combination a circuit, a device comprising an impedance coil connected to said circuit, and means comprising a thermionic device arranged to vary the impedance of said coil in response to any variation in a characteristic of said circuit.

16. In combination a circuit, a thermionic device comprising an anode and a cathode operated according to a characteristic of said circuit, a device comprising a core, an impedance winding connected to said circuit and wound on said core, and a winding connected between said cathode and anode and wound on said core for varying the impedance of said impedance winding in response to any variation in a characteristic of said circuit.

17. In combination a circuit, a thermionic tube, means for continuously operating said tube according to a characteristic of said circuit, and means comprising an impedance coil connected to said circuit and having the impedance thereof continuously under the control of said tube to maintain the characteristic of said circuit constant.

18. In combination a circuit, a thermionic tube continuously operated according to a characteristic of said circuit, an impedance coil inserted in said circuit, and connecting means between said tube and said coil for continuously controlling the impedance of the coil according to the operation of said tube to maintain the characteristic of the circuit substantially constant.

19. In combination a circuit, an impedance coil connected to said circuit, means comprising a thermionic device for continuously regulating the impedance of said coil in response to any variation in a characteristic of said circuit to maintain the characteristic of the circuit constant.

In witness whereof, I hereunto subscribe my name this first day of September, A. D. 1924.

ARTHUR A. OSWALD.

This 11th day of August, A. D. 1924.

ERNST J. STERBA.